United States Patent

Hori et al.

[11] Patent Number: 5,549,336
[45] Date of Patent: Aug. 27, 1996

[54] HIGH TORQUE TOOL JOINT

[75] Inventors: Mitsuaki Hori; Yukihiko Ebihara; Katsumi Wadano, all of Tokyo, Japan

[73] Assignee: NKK Corporation, Tokyo, Japan

[21] Appl. No.: 369,866

[22] Filed: Jan. 5, 1995

Related U.S. Application Data

[63] Continuation of Ser. No. 84,244, filed as PCT/JP92/01443, Nov. 6, 1992 published as WO93/09375, May 13, 1993, abandoned.

[30] Foreign Application Priority Data

Nov. 8, 1991 [JP] Japan ................... 3-319607

[51] Int. Cl.⁶ ........................................... F16L 25/00
[52] U.S. Cl. ............................. 285/333; 285/390
[58] Field of Search ............................ 285/334, 333, 285/355, 390, 93

[56] References Cited

U.S. PATENT DOCUMENTS

| | | | |
|---|---|---|---|
| 4,153,283 | 5/1979 | Hellmund et al. | 285/334 |
| 4,548,431 | 10/1985 | Holl et al. | 285/334 |
| 4,730,857 | 3/1988 | Schwind | 285/390 |
| 4,984,829 | 1/1991 | Saigo et al. | 285/334 |
| 5,064,224 | 11/1991 | Tai | 285/334 X |

FOREIGN PATENT DOCUMENTS

| | | |
|---|---|---|
| 52-39821 | 3/1977 | Japan. |
| 109975 | 8/1981 | Japan. |
| 58-152994 | 9/1983 | Japan. |
| 58-045632 | 10/1983 | Japan. |
| 59-011063 | 3/1984 | Japan. |
| 60-030877 | 7/1985 | Japan ................... F16L 15/04 |
| 63-501167 | 4/1988 | Japan. |
| 1503395 | 3/1978 | United Kingdom. |
| WO87/01786 | 3/1987 | WIPO. |

*Primary Examiner*—Dave W. Arola
*Attorney, Agent, or Firm*—Frishauf, Holtz, Goodman, Langer & Chick

[57] ABSTRACT

A tool joint for drill pipes having a female thread 4 and a male thread 3 on both ends and having shoulders 5 and 8 on the external side of the male threaded portion and on the internal side of the female threaded portion respectively to cause both shoulders to be in flat contact with the corresponding tips. Also, the length from the shoulder on the tubular body side of each threaded section is made longer than the connection length of the male thread side of the general-purpose type tool joint and is made shorter than the connection length of the female thread side of the same. Also, the clearance ranges from 0 to 0.5 mm when hand-tightened at the internal shoulder. As compared with the conventional API tool joint with an external shoulder, the tool joint of the present invention also features an internal shoulder and can thus withstand higher torque, being interchangeable with conventional API tool joints.

3 Claims, 1 Drawing Sheet

HIGH TORQUE TOOL JOINT

This application is a continuation of application Ser. No. 08/084,244, filed as PCT/JP92/01443, Nov. 6, 1992 published as WO93/09375, May 13, 1993, and now abandoned.

TECHNICAL FIELD

The present invention relates to a new high torque tool joint which is suitable for use in hydrogen sulfide environments because of its capacity to withstand high torque and to reduce tensile stress produced at the thread connection portion. This new tool joint is interchangeable with general-purpose type tool joints.

BACKGROUND ART

Up to now, API tool joints have been widely employed as threaded joints for drill pipes used in drilling oil and gas wells of up to several kilometers in depth. As FIG. 2 shows, the general-purpose API tool joint (hereinafter called general-purpose tool joint) is provided with a female threaded portion 14 at one end of tubular body 12. Conversely, tubular body 11 is provided with a male threaded portion 13 and an external shoulder 15 at one end. These tubular bodies are designed so that external shoulder 15 contacts the tip 16 of the tubular body 12 when the male threaded portion 13 and the female threaded portion 12 are connected.

The said general-purpose tool joint is designed to transmit torque at the time of drilling through the external shoulder and has been widely used for connecting drill pipes used in drilling oil wells.

Tool joints featuring two shoulders have been previously proposed, for example, in JP,A No. 58-152992, JP,B Nos. 58-25632, 59- 11063, JP,A No. 63-501167, but the number of these tool joints used has been quite limited as compared with the above general-purpose tool joint.

In the case of the aforementioned tool joints, the external shoulder and friction torque at the thread connection portion bear the torque. Thus, if excessive torque occurs at the bottom of a well during drilling, the external shoulder will yield, causing the tubular body 12 to expand in bell-shaped deformation, or resulting in breakage of the thread portion as pointed out in the Drilling Manual and other documents.

The API standard states that the strength of the abovementioned tool joint should be more than 80% of the torsional strength of the pipe. In the case of high-grade pipes, however, the strength does not satisfy the standard resulting in the occurrence of various troubles.

Also, tool joints other than the abovementioned general-purpose tool joints are not interchangeable with general-purpose types and cannot been used with general-purpose drill pipes already prepared at drilling sites for drilling wells up to several kilometers deep. Thus, they are not adopted for practical drilling applications.

The tool joints disclosed in the above JP,A No. 58-152992, etc. have peculiar and complicated threads. As a result, the use of such tool joints requires extra work processes, leading to longer construction periods.

SUMMARY OF THE INVENTION

The aim of the present invention is to provide a tool joint which enables connected drill pipes to withstand high torque and balances them effectively for stable drilling. For connection, the tubular body features a female thread on one end and a male thread on the other, whereby the external shoulder on the male thread side and the internal shoulder on the female thread side contact the tips of the drill pipes respectively when the tool joint is used to connect drill pipes.

The connection lengths from the shoulders to the tips of the above tubular body are made shorter than the connection length on the female thread side of the general-purpose tool joint, making it interchangeable with general-purpose tool joints and allowing it to be properly used at drilling sites.

With the abovementioned composition, the clearance at the internal shoulder is designed to be 0 to 0.5 mm when tightened firmly by hand. This allows the connection to withstand high torque and can effectively reduce tensile stress produced in the thread connection portion. If the clearance is above 0.5 mm, the internal shoulder may not contact properly, and the external shoulder may yield. The tool joint of the present invention effectively prevents such a problem.

DETAILED DESCRIPTION INVENTION

Figure 1:
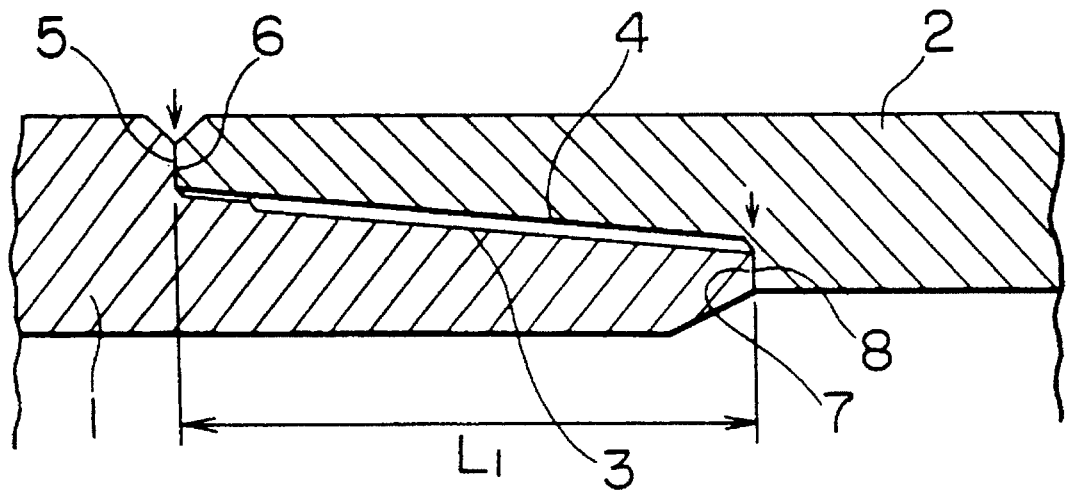
FIG. 1 is a partial sectional view of the connection of a tool joint based on the present invention.

Explaining the concrete embodiment of the aforementioned present invention, as FIG. 1 shows, when the internal female thread 4 at the end of the tubular body 2 is connected to the external male thread 3 at the end of the other tubular body 1, the external shoulder 5 on tubular body 1 contacts the tip 6 of the tubular body 2 and also the internal shoulder 8 of the tubular body 2 contacts the tip 7 of the other tubular body 1. The length $L_1$ from the shoulder to each tip is made shorter than the connection length $L_2$, which is shown in FIG. 2, of the female thread 14 of the tubular body of the general-purpose tool joint.

Figure 2:
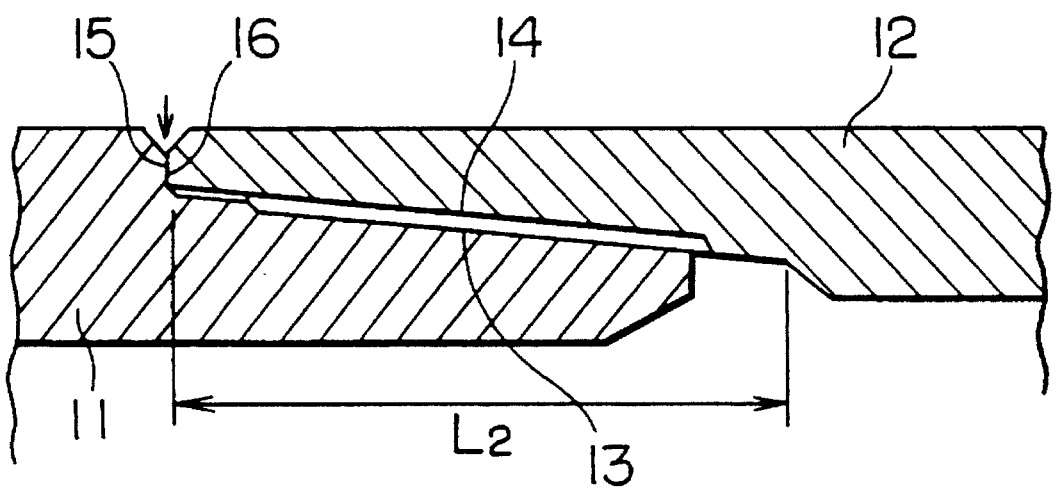
FIG. 2 is a partial sectional view of the connection of the conventional API tool joint which has been widely used for drilling oil wells.

Comparing FIGS. 1 and 2, it is clear that, since the connection length $L_1$ of the tool joint based on the present invention is made shorter than $L_2$ of the general-purpose tool joint, the tubular body 1 can be connected to the tubular body 12 of the general-purpose tool joint shown in FIG. 2 instead of the tubular body 11 of the general-purpose tool joint. Also, the tool joint 2 based on the present invention can be properly connected to the tubular body 11 of the general-purpose tool joint. This means that the new tool joint is fully interchangeable with the general-purpose type.

The connection of the external shoulder 5 and the tip 6 bears torque and seals out mud, etc. On the other hand, the connection of the internal shoulder 8 and the tip 7 of the tubular body bears torque only or bears torque and seals out mud. By designing the clearance at the internal shoulder 8 to be less than 0.5 mm (0 to 0.5 mm), the new tool joint is able to bear high torque and reduce tensile stress produced in the male thread 3 portion of the tubular body 1.

The present invention is embodied with a pipe of NC 50 material having an outer diameter of 16.8 cm (6⅝ in) and an inner diameter of 7 cm (2¾ in). The new tool joint and the conventional general-purpose tool joint were tightened respectively at tightening turning angles of 50° (at which the same-size general-purpose tool joint shown in FIG. 2 started to yield at the external shoulder) and 75°, changing the clearance at the internal shoulder of the new tool joint from 0 to 1.0 mm. Consequently, levels of torque and tensile stress produced at the joint threads were measured as follows:

| LEVEL | TOOL JOINT | TIGHTENING TURNING ANGLE | CLEARANCE AT INTERNAL SHOULDER WHEN HAND-TIGHTENED (mm) | TIGHTENING TORQUE (kJ) | TENSILE STRESS AT THREAD (MPa) |
|---|---|---|---|---|---|
| 1 |  |  | 0 | 142 | 394 |
| 2 | Tool joints of the | 50° | 0.1 | 143 | 412 |
| 3 |  |  | 0.5 | 137 | 441 |
| 4 | present invention |  | 1.0* | 118* | 774* |
| 5 | However, clearances |  | 0 | 167 | 544 |
| 6 | marked with * are | 75° | 0.1 | 165 | 533 |
| 7 | not related to the |  | 0.5 | 157 | 527 |
| 8 | present invention |  | 1.0* | 118* | 789* |
| 9 | Conventional general | 50° | — | 117 | 794 |
| 10 | purpose tool joint | 75° | — | 119 | 931 |

When the clearance at the internal shoulder ranges from 0 to 0.5 mm when hand-tightened, the tool joint based on the present invention can create constant, high tightening torque and generate tensile stress as low as 200 to 550 MPa at the thread portion. At a turning angle of 50°, the torque is increased by about 14%, and at 75°, it becomes about 40% higher compared with conventional general-purpose tool joints.

Though threaded sections affected by tensile stress are usually broken in hydrogen sulfide environments, the tool joint of the present invention generates low tensile stress as mentioned above and is suitable for use in such environments.

INDUSTRIAL APPLICABILITY

The tool joint of the present invention can generate high torque, enables balanced, stable drilling to proceed smoothly, and is highly suited to the drilling of oil wells where excessive torque is expected, oil wells with hydrogen sulfide environments, dogleg wells and extremely deep wells, in addition to general drilling applications. It can also reduce tensile stress produced at the threaded connection portions and is suitable for use in hydrogen sulfide environments. In addition, it is interchangeable with general-purpose tool joints used in drilling these types of wells and can be effectively adopted at such drilling sites. Thus, the present invention is highly effective for applications in the drilling industry.

We claim:

1. A high torque tool joint for drill pipes, comprising:
   a female threaded pipe member having female threads along at least a portion thereof; and
   a male threaded pipe member having male threads along at least a portion thereof, said male and female pipe members being connectable continuously along respective threaded portions thereof to form a threaded joint;
   a first flat shoulder provided on an external side of said male threaded pipe member, said first flat shoulder not having a relief recess;
   a second flat shoulder provided on an internal side of said female threaded pipe member, said second flat shoulder not having a relief recess;
   said male and female pipe members having respective flat tip ends, said female threads of said female threaded pipe member extending at least from said second flat shoulder to a point proximate the female pipe member flat tip end, said male threads of said male threaded pipe member extending at least from said male pipe member flat tip end to a point proximate said first flat shoulder;
   at least said first flat shoulder being in substantial flat surface contact with the flat tip end of said female threaded pipe member when said male and female pipe members are connected together;
   wherein a length from said first and second flat shoulders to the respective tip ends of the male and female pipe members is shorter than a corresponding connection length on a female thread side of a conventional tool joint and is longer than a given corresponding connection length on the male thread side; and
   wherein a clearance is provided at said second flat internal shoulder and said male threaded pipe member flat tip end which ranges from 0.1 to 0.5 mm when the threaded joint is tightened by hand to cause the flat external shoulder of said male threaded pipe member to substantially contact said flat tip end of said female threaded pipe member.

2. The high torque tool joint of claim 1, wherein said clearance is about 0.5 mm.

3. The high torque tool joint of claim 1, wherein said clearance is about 0.1 mm.

* * * * *